(12) United States Patent
Le Biez et al.

(10) Patent No.: US 10,870,152 B2
(45) Date of Patent: Dec. 22, 2020

(54) ABRADABLE COATING HAVING VARIABLE DENSITIES

(71) Applicants: SAFRAN AIRCRAFT ENGINES, Paris (FR); CENTRE NATIONAL DE LA RECHERCHE SCIENTIFIQUE, Paris (FR); UNIVERSITE PAUL SABATIER - TOULOUSE III, Toulouse (FR)

(72) Inventors: Philippe Charles Alain Le Biez, Moissy-Cramayel (FR); Geoffroy Chevallier, Auzeville-Tolosane (FR); Romain Epherre, Toulouse (FR); Claude Estournes, Rieumes (FR); Jean-Baptiste Mottin, Moissy-Cramayel (FR); Serge Georges Vladimir Selezneff, Moissy-Cramayel (FR)

(73) Assignees: SAFRAN AIRCRAFT ENGINES, Paris (FR); CENTRE NATIONAL DE LA RECHERCHE SCIENTIFIQUE, Paris (FR); UNIVERSITE PAUL SABATIER - TOULOUSE III, Toulouse (FR)

( * ) Notice: Subject to any disclaimer, the term of this patent is extended or adjusted under 35 U.S.C. 154(b) by 190 days.

(21) Appl. No.: 16/062,224

(22) PCT Filed: Dec. 13, 2016

(86) PCT No.: PCT/FR2016/053358
§ 371 (c)(1),
(2) Date: Jun. 14, 2018

(87) PCT Pub. No.: WO2017/103420
PCT Pub. Date: Jun. 22, 2017

(65) Prior Publication Data
US 2018/0361480 A1 Dec. 20, 2018

(30) Foreign Application Priority Data

Dec. 14, 2015 (FR) .................................... 15 62318

(51) Int. Cl.
*B22F 7/08* (2006.01)
*B22F 3/105* (2006.01)
(Continued)

(52) U.S. Cl.
CPC ............... *B22F 7/08* (2013.01); *B22F 3/105* (2013.01); *B22F 7/06* (2013.01); *C23C 24/08* (2013.01);
(Continued)

(58) Field of Classification Search
CPC ....................................................... B22F 7/08
(Continued)

(56) References Cited

U.S. PATENT DOCUMENTS 4,914,794 A * 4/1990 Strangman ............ F01D 11/122
29/527.2
5,236,151 A 8/1993 Hagle et al.
(Continued)

FOREIGN PATENT DOCUMENTS

CN 1427085 A 7/2003
CN 103375193 A 10/2013
(Continued)

OTHER PUBLICATIONS

Office Action dated Nov. 27, 2019, in Chinese Patent Application No. 2016800732609 (16 pages).
(Continued)

*Primary Examiner* — Tabatha L Penny
(74) *Attorney, Agent, or Firm* — Bookoff McAndrews, PLLC

(57) ABSTRACT

A method of fabricating an abradable coating of varying density, and such an abradable coating of varying density.
(Continued)

According to the invention, the method comprises the following steps: providing a substrate (32) having a first portion with its surface situated at a first level (A), and a second portion with its surface situated at a second level (B) different from the first level; depositing a precursor material on the first and second portions of the substrate (32); compressing the precursor material between the substrate and a bearing surface; and sintering the precursor material as compressed in this way in order to obtain an abradable coating (36) having a first portion (36*a*) on the first portion of the substrate, and possessing a first density, and a second portion (36*b*) on the second portion of the substrate, and possessing a second density distinct from the first.

9 Claims, 2 Drawing Sheets

(51) Int. Cl.
| | | |
|---|---|---|
| *F01D 11/12* | (2006.01) | |
| *C23C 24/08* | (2006.01) | |
| *B22F 7/06* | (2006.01) | |
| *F04D 29/52* | (2006.01) | |

(52) U.S. Cl.
CPC ............ *C23C 24/082* (2013.01); *F01D 11/12* (2013.01); *F01D 11/122* (2013.01); *F04D 29/526* (2013.01); *B22F 2003/1051* (2013.01); *B22F 2998/10* (2013.01); *F05D 2220/32* (2013.01); *F05D 2230/10* (2013.01); *F05D 2230/22* (2013.01); *F05D 2230/31* (2013.01); *F05D 2230/90* (2013.01); *F05D 2240/11* (2013.01); *F05D 2300/514* (2013.01); *Y02T 50/60* (2013.01)

(58) Field of Classification Search
USPC ...................................................... 427/376.1
See application file for complete search history.

(56) References Cited

U.S. PATENT DOCUMENTS

| | | |
|---|---|---|
| 2009/0136345 A1 | 5/2009 | Tholen et al. |
| 2009/0297331 A1 | 12/2009 | Caucheteux et al. |
| 2011/0103940 A1 | 5/2011 | Duval et al. |
| 2012/0107103 A1 | 5/2012 | Kojima et al. |
| 2013/0177740 A1 | 7/2013 | Merrill et al. |
| 2013/0344347 A1* | 12/2013 | Hugot ..................... B23P 6/007 428/547 |
| 2014/0263579 A1* | 9/2014 | Kulkarni .............. B23K 1/0018 228/119 |
| 2015/0240651 A1 | 8/2015 | Tham et al. |
| 2015/0266093 A1 | 9/2015 | Ferrer |
| 2015/0337672 A1 | 11/2015 | McCaffrey et al. |
| 2015/0354392 A1 | 12/2015 | Lipkin et al. |
| 2016/0236995 A1 | 8/2016 | Lai et al. |

FOREIGN PATENT DOCUMENTS

| | | |
|---|---|---|
| CN | 103827352 A | 5/2014 |
| CN | 103874580 A | 6/2014 |
| CN | 104451519 A | 3/2015 |
| EP | 2317079 A2 | 5/2011 |
| EP | 3081764 A1 | 10/2016 |
| JP | 2009/256759 A | 11/2009 |
| RU | 2320776 C2 | 3/2008 |
| SU | 997111 A1 | 2/1983 |

OTHER PUBLICATIONS

Office Action dated Mar. 2, 2020, in Russian Patent Application No. 2018125846 (12 pages).
Official Communication dated Jun. 3, 2020, in EP Application No. 16825838.2 (5 pages).

* cited by examiner

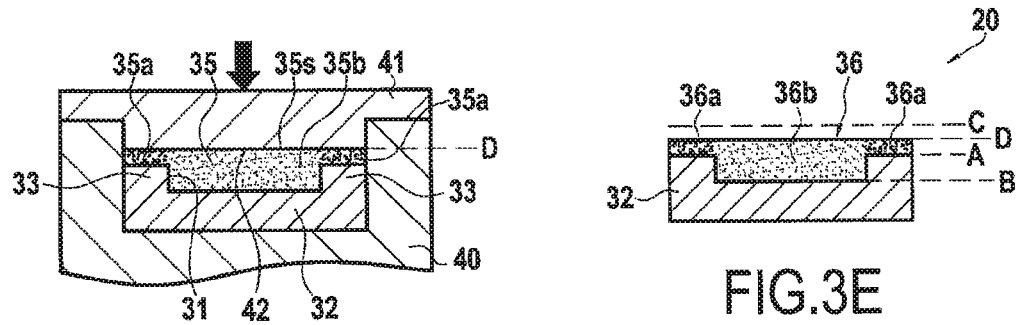
FIG.3D
FIG.3E
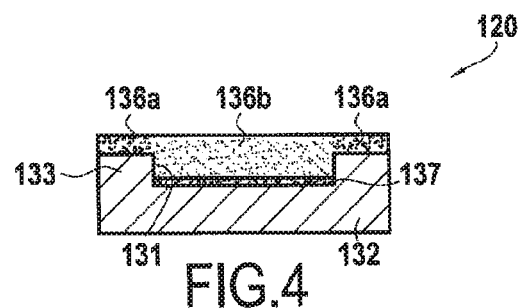
FIG.4
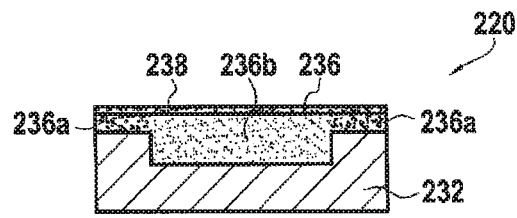
FIG.5

ABRADABLE COATING HAVING VARIABLE DENSITIES

CROSS-REFERENCE TO RELATED APPLICATIONS

This application is the U.S. national phase entry under 35 U.S.C. § 371 of International Application No. PCT/FR2016/053358, filed on Dec. 13, 2016, which claims priority to French Patent Application No. 1562318, filed on Dec. 14, 2015, the entireties of each of which are herein incorporated by reference.

FIELD OF THE INVENTION

The present disclosure relates to a method of fabricating an abradable coating of varying density, and also to such an abradable coating of varying density.

Such an abradable coating may be used in particular for fitting to a ring of a rotary machine so as to provide the machine with sealing at the tips of rotating blades, for example. Such an abradable coating is particularly adapted for fitting to turbine rings in the field of aviation, and most particularly in airplane turbojets.

STATE OF THE PRIOR ART

In numerous rotary machines, it is now the practice to provide the stator ring with abradable tracks facing the tips of blades of the rotor. Such tracks are made using so-called "abradable" materials that, on coming into contact with the rotating blades, wear more easily than the blades. This ensures minimal clearance between the rotor and the stator, thereby improving the performance of the rotary machine, without running the risk of damaging the blades in the event of them rubbing against the stator. On the contrary, such rubbing abrades the abradable tracks, thereby automatically matching the diameter of the stator ring very closely to the rotor. Such abradable tracks are thus often put into place in the compressors of turbine engines.

In contrast, they are used much more rarely in the turbines of such machines, particularly in high pressure turbines, where physico-chemical conditions are extreme.

Specifically, the burnt gas from the combustion chamber penetrates into the high pressure turbine at temperature and pressure levels that are very high, thereby leading to premature erosion of conventional abradable tracks.

Under such circumstances, in order to protect the turbine ring, it is often preferred to provide it with a thermal barrier type coating of materials that serve to protect the ring against erosion and corrosion while presenting density that is too great for the coating to be effectively abradable.

Nevertheless, it can naturally be understood that under such circumstances, the integrity of the blades is no longer ensured in the event of contact with the stator, which means that it is necessary to provide greater clearance between the rotor and the stator, thereby increasing the rate of leakage past the tips of the blades and thus reducing the performance of the turbine.

There therefore exists a real need for a method of fabricating an abradable coating and for such an abradable coating that avoid the drawbacks inherent to the above-mentioned known configurations, at least in part.

SUMMARY OF THE INVENTION

The present disclosure provides a fabrication method for an abradable coating of varying density, the method comprising the following steps: providing a substrate having a first portion with its surface situated at a first level, and a second portion with its surface situated at a second level different from the first level; depositing a precursor material on the first and second portions of the substrate; compressing the precursor material between the substrate and a bearing surface; and sintering the precursor material as compressed in this way in order to obtain an abradable coating having a first portion on the first portion of the substrate, and possessing a first density, and a second portion on the second portion of the substrate, and possessing a second density distinct from the first.

This method makes it possible to obtain a coating of varying density. Specifically, because of the difference in level between the first portion and the second portion of the substrate, the volume reduction that is available during the compression step is greater when the substrate is closer to the bearing surface in the initial state: for example, assuming that the second level is deeper than the first level, the portion of the precursor material situated over the first portion of the substrate is thus compressed more than is the portion of the precursor material situated over the second portion of the substrate. Greater pressure therefore exists in this portion of the precursor material, thereby leading to greater density of the material after sintering. Conversely, in the second portion of the precursor material, since the compression is less, the reduction in the porosity of the material and thus its densification are likewise less. In the present disclosure, the term "porosity" is used to designate the ratio of the volume of interstitial spaces between the grains of the material in question divided by the overall volume of said material. In addition, in the present disclosure, it should be understood that the first and second portions of the substrate, like the first and second portions of the abradable coating, are of significant size in order to be able to perform the functions for which they are intended. Thus, as can be seen in the figures, each portion of the substrate, and thus each portion of the abradable coating possesses a width that is greater than 2 millimeters (mm), preferably greater than 5 mm, and thus a length that is greater still.

Under such circumstances, by means of this method, it is possible to adjust locally the final porosity, and thus the density, of the coating in order to satisfy requirements or constraints that differ locally. For example, it is possible to provide those zones of the coating that are sensitive to erosion with density that is high, and to provide those zones of the coating that are to come into contact with a moving body with density that is lower, thereby reinforcing the easily abradable nature of such zones. In addition, it is possible to arrange the first coating portion, i.e. the portion of greater density, in such a manner as to mask and thus protect the second coating portion, which is of density that is lower.

In certain implementations, the second portion of the substrate is obtained by machining at least one groove in a blank of the substrate. Such a two-level substrate is thus easy to fabricate since it suffices to fabricate a blank that is regular and then machine a groove in the blank solely at the desired locations.

In other implementations, the first portion of the substrate is obtained by adding at least one low wall on a blank for the substrate. This method is particularly suitable for repairing an existing part of thickness that is not sufficient for machining a groove.

In certain implementations, the low wall is fabricated directly on the blank for the substrate by sintering, in particular by a sintering method of the spark plasma sintering (SPS) type.

In other implementations, the low wall is fabricated independently and is fitted on by welding or brazing. In particular, it may be fitted on by a tungsten inert gas (TIG) type welding method.

In certain implementations, the bearing surface is continuous. It should be understood that the bearing surface does not have any discontinuity such as a step or any other sudden change of level.

In certain implementations, the bearing surface is rectilinear, at least in a direction extending transversely to the first and second portions of the substrate. There thus exists a section plane passing both through the first portion and the second portion of the substrate and in which the bearing surface is rectilinear.

In certain implementations, the bearing surface is in the form of a sector of a cylinder, preferably a sector of a circular cylinder.

In certain implementations, the bearing surface is a surface of a shaping mold.

In certain implementations, the first portion of the abradable coating possesses final porosity of less than 15%, preferably less than 5%. The first portion of the coating thus possesses density that is sufficiently high to withstand erosion.

In certain implementations, the second portion of the abradable coating possesses final porosity greater than 20%, preferably greater than 30%. The second portion of the coating thus possesses density that is sufficiently low to present easily-abradable behavior.

In certain implementations, the first portion of the abradable coating is subjected to densification by at least 150%, and preferably by least 250% during the compression and sintering steps. In the present disclosure, the term "densification" is used to mean the increase in the density of the material making up the abradable coating between its initial step when the precursor material is deposited and its final step obtained after the compression and sintering steps. In other words, it is the difference between the final density and the initial density divided by the initial density.

In certain implementations, the second portion of the abradable coating is subjected to densification of at most 150%, preferably at most 100% during the compression and sintering step.

In certain implementations, prior to the step of depositing the precursor material on the first and second portions of the substrate, the method further comprises a step of forming a backing layer by sintering on the second portion of the substrate, the backing layer having porosity of less than 15%, and preferably less than 5%. This backing layer serves to conserve a highly densified layer under the second portion of the abradable coating, which second portion is densified little. Thus, the substrate remains protected in the event of the body traveling past the coating being subjected to a radial offset that is greater than the maximum expected offset. This serves in particular to protect the substrate in the event of a large unbalance in the moving body, for example.

In certain implementations, after the step of sintering the precursor material, the method further comprises a step of forming a surface layer by sintering on at least one portion of the abradable coating, preferably on its central portion, the surface layer having final porosity of less than 15%, and preferably less than 5%. This layer makes it possible to ensure that the coating has little surface roughness. It is preferably formed on the entire surface of the abradable coating.

In certain implementations, the thickness of the surface layer lies in the range 0.05 mm to 0.10 mm.

In certain implementations, the precursor material is a powder of metal or of ceramic.

In certain implementations, the substrate is a ring sector. In particular, it may be a turbine ring sector for mounting on the stator of the turbine.

In certain implementations, the first portion of the substrate extends along the second portion of the substrate.

In certain implementations, the substrate possesses a longitudinal channel extending between two longitudinal shoulders, the shoulders forming part of the first portion of the substrate and the bottom of the channel forming part of the second portion of the substrate. At the end of the method, this leads to a strip of low density, i.e. that is easily abradable, in the zone that is likely to make contact, e.g. with the blades of a rotor, and two strips of coating that are of greater density on either side of the abradable strip, serving to protect the abradable strip from erosion, e.g. as caused by the axial flow of a stream of air.

The present disclosure also provides an abradable track of varying density, comprising a first portion including sintered material possessing a first density, and a second portion, contiguous with the first portion and flush therewith, including a sintered material possessing a second density distinct from the first density. As explained above, this makes it possible to protect the zones that are more sensitive to erosion, while providing a layer that is easily abradable in the zones that are to come into contact with the moving body.

In certain embodiments, the thickness of the first portion of the abradable track is less than the thickness of the second portion.

In certain embodiments, the abradable track is obtained using a fabrication method according to any one of the above implementations.

The present disclosure also provides a turbine or compressor ring including an abradable track according to any one of the above embodiments.

The present disclosure also provides a turbine engine including an abradable track or a turbine or compressor ring according to any of the above embodiments.

The above characteristics and advantages, and others, appear on reading the following detailed description of examples of the proposed device and method. The detailed description refers to the accompanying drawings.

BRIEF DESCRIPTION OF THE DRAWINGS

The accompanying drawings are diagrammatic and seek above all to illustrate the principles of the invention.

In the drawings, from one figure to another, elements (or portions of an element) that are identical are identified by the same reference signs. In addition, elements (or portions of an element) belonging to different examples but having functions that are analogous are identified in the figures by numerical references incremented by 100, 200, etc.

FIGS. 3A to 3E show various successive steps in an example method of the invention.

FIG. 4 is a section view of a second example of an abradable track.

FIG. 5 is a section view of a third example of an abradable track.

DETAILED DESCRIPTION OF EXAMPLE(S)

In order to make the invention more concrete, examples of methods and abradable tracks are described below in detail with reference to the accompanying drawings. It should be recalled that the invention is not limited to these examples.

Figure 1:
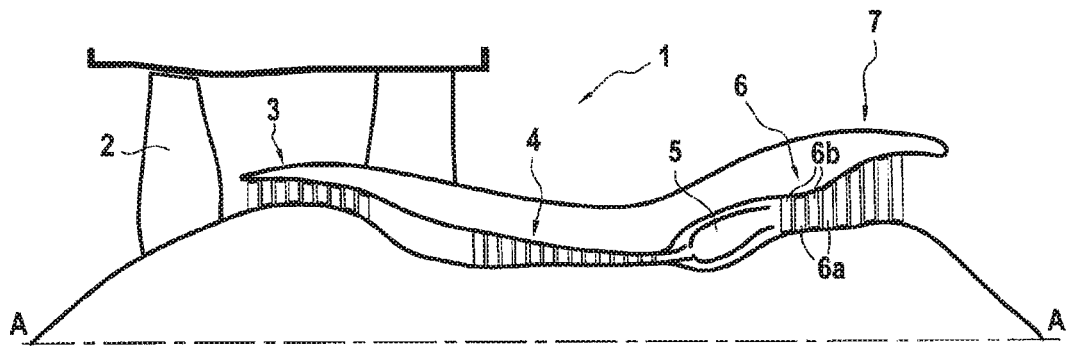
FIG. 1 is a section view of a turbine engine of the invention.

FIG. 1 is a section view of a bypass turbojet 1 of the invention, the section being on a vertical plane containing the main axis A of the turbojet. Going from upstream to downstream in the air stream flow direction, the turbojet comprises: a fan 2; a low pressure compressor 3; a high pressure compressor 4; a combustion chamber 5; a high pressure turbine 6; and a low pressure turbine 7.

Figure 2:
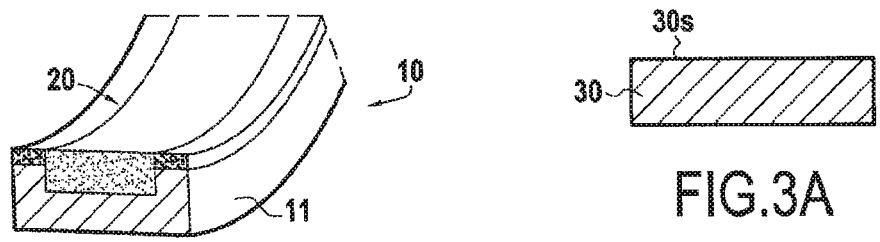
FIG. 2 is a fragmentary perspective view of an example of a stator ring of the invention.

The high pressure turbine 6 has a plurality of blades 6a rotating with the rotor and a plurality of guide vanes 6b mounted on the stator. The stator of the turbine 6 comprises a plurality of stator rings 10 arranged facing the movable blades 6a of the turbine 6. As can be seen in FIG. 2, each stator ring 10 is subdivided into a plurality of sectors 11, each provided with an abradable track 20 against which the movable blades 6a rub in the event of a radial excursion of the rotor.

Figure 3A:
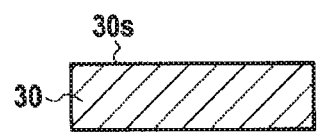

An example of such an abradable track 20 is described with reference to FIGS. 3A to 3E. In FIG. 3A, a blank 30 is initially provided. Specifically, it comprises a ring sector obtained using a conventional method. Its surface 30s is regular, rectilinear in the axial section plane of FIG. 3A, and circularly arcuate in a radial section plane.

Figure 3B:
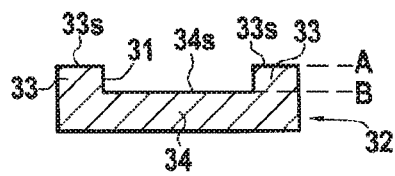

As shown in FIG. 3B, a groove 31 is then machined longitudinally, i.e. circumferentially, in the surface of the blank 30 so as to form a channel: this produces a substrate 32 possessing two shoulders 33 on either side of the groove 31, respectively upstream and downstream.

Together, these two shoulders form a first substrate portion 33 having its surface 33s extending at a first level A corresponding to the initial level of the blank 30. The portion of the substrate 32 situated at the bottom of the groove 31 forms a second substrate portion 34 having its surface 34s extending at a second level B that is lower than, i.e. deeper than, the first level A and that corresponds to the bottom of the groove 31. In the present example, the groove 31 is 12 mm deep, in other words the difference between the levels A and B is 12 mm.

Figure 3C:
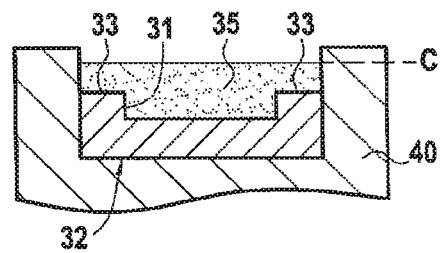

As shown in FIG. 3C, the substrate 32 as formed in this way is then placed in the cavity of a shaping mold 40 of axial dimensions that correspond to the dimensions of the substrate 32.

A precursor material 35, specifically a metal powder, is then deposited in uniform manner over all of the substrate 32. The powder 35 thus completely fills the channel 31 and forms a continuous layer of constant thickness over level A on the shoulders 33 of the substrate 32. The powder 35 is thus added until it reaches a third level C: in the present example, this level C is located 20 mm above the level A of the shoulders 23 of the substrate. In the present example, the powder is a nickel powder of grain size centered around 100 μm; its initial porosity is about 70%.

Naturally, this initial porosity may vary depending on the type of powder used and on the desired final porosities: for example, for nickel powders having a grain size of about 4 μm to 7 μm, the initial porosity may be about 23% to 33%.

Preferably, powders having a high initial porosity are used for the abradable zone of low density. In addition, it is possible to obtain a greater initial porosity by adding a pore-generating agent to such powders, which is subsequently eliminated during the method, e.g. during a pyrolysis step.

In contrast, powders that are finer with a lower initial porosity can be used for the higher-density zones such as the low walls, the backing layer, or the surface layer of low roughness, as described below.

Thus, the powder 35 forms a 20 mm thick layer over the shoulders 33, and a 32 mm thick layer over the central channel 31.

As shown in FIG. 3D, the mold 40 is then closed. A bearing face 42 of its cover 41, which is rectilinear in the axial plane of FIG. 3D and circularly arcuate in a radial plane, then bears against the surface 35s of the powder layer 35.

Stress is then exerted on the cover 41 of the mold 40 in order to press against the powder layer 35 and compress it between the substrate 32 and the bearing face 42 of the cover 41 of the mold 40. The powder layer 35 is thus compressed to a fourth level D that lies specifically 4.2 mm above the shoulders 33 of the substrate, i.e. 4.2 mm above the level A.

During this compression step, the particles of powder 35 are compacted against one another, thereby filling in some of the voids initially present between the particles, with the air that is expelled in this way being discharged from the mold 40. The porosity of the powder therefore decreases during this compression step, and the density of the powder increases.

Nevertheless, this densification depends on the position of the volume of powder under consideration within the powder layer 35. Specifically, ignoring phenomena of the powder migrating naturally, the volumes of powder 35a situated between the shoulders 33 and the bearing surface 42 are subjected to an available volume reduction and thus to compression that is greater than the volume of powder 35b situated in and over the channel 31.

Specifically, over the shoulders 33, the initially available thickness corresponds to the difference in level between the levels A and C, i.e. 20 mm in this example, while the thickness available after compression corresponds to the difference of level between the levels A and D, i.e. 4.2 mm: the powder volume 35a is thus subjected to a 79% reduction in volume.

In contrast, over the second portion 34 of the substrate 32, the initially available thickness corresponds to the level difference between the levels B and C, i.e. 32 mm in this example, while the thickness available after compression corresponds to the level difference between the level B and D, i.e. 16.2 mm: the powder volume 35a is thus subjected to a 49% reduction in volume.

Under such circumstances, insofar as the mass of powder remains constant in each powder volume 35a and 35b, it is possible to calculate the densification of the material using the following formula, in which $e_i$ is the initial thickness of the material and $e_f$ is its final thickness:

$$\text{densification} = \frac{d_f - d_i}{d_i} = \frac{m/V_f - m/V_i}{m/V_i} = \frac{V_i - V_f}{V_f} = \frac{e_i - e_f}{e_f}$$

It can thus be deduced that the first powder volume 35a is subjected to densification, i.e. to an increase in its density, of 376%, while the second powder volume 35b is subjected to densification of 98%.

Once such a compressed state has been obtained, the powder layer 35 as differently compressed in this way is sintered using a conventional method.

At the end of the sintering step, the abradable track 20 of FIG. 3E is obtained in which the substrate 32 is covered in a coating 36 having a first portion 36a overlying the shoulders 33 with a thickness of 4.2 mm and a final porosity of 14.7%, together with a second portion 36b overlying the channel 31 and possessing thickness of 16.2 mm and final porosity of 35.7%.

In this respect, the final porosity $P_f$ can be calculated generally as a function of the initial porosity $P_i$ and of the compression ratio Tc, i.e. the reduction in volume, of the portion of material under consideration:

$$P_f = P_i(1-Tc)$$

Naturally, the depth of the groove 31, the initial thickness of powder 35, and the amplitude of compression may be freely adjusted in order to achieve the desired densities and thickness for the coating.

Furthermore, in this example, the channel 31 of the substrate extending at a level B lower than the level of the shoulders 33 is a groove obtained by machining the blank 30. Nevertheless, in a variant of the first implementation, an analogous channel could be obtained by adding low walls onto the blank 30 so as to form shoulders 33 on either side of the channel 31: under such circumstances, the initial level of the blank defines the level B of the bottom of the channel 31, while the top of the walls define the level A.

In a second example, shown in FIG. 4, the method has an additional step that takes place immediately after providing a substrate 132 having two levels A and B. A backing layer 137 of high density, e.g. having final porosity in the range 0 to 15% is put into place on the bottom of the channel 131 by sintering a powder. Thereafter the method remains unchanged compared with the first example, the layer of precursor material being deposited onto the shoulders 133 and onto the backing layer 137.

At the end of the method, an abradable track 120 as shown in FIG. 4 is thus obtained in which the second coating portion 136 of lower density covers the backing layer 137, which backing layer protects the substrate in the event of a radial offset of the body traveling past the coating that is greater than the maximum intended offset, e.g. in the event of a large unbalance of the moving body.

In a third example, compatible with the first and second examples and shown in FIG. 5, the method includes an additional step that takes place immediately after the steps of compressing and sintering the powder, the beginning of the method remaining unchanged compared with the first or the second example. A surface layer 238 of high density, i.e. possessing final porosity in the range 0 to 15%, and of small thickness, e.g. lying in the range 0.05 mm to 0.10 mm, is put into place by sintering a powder at the surface of the coating 236 of varying density. At the end of the method, the abradable track 220 of FIG. 5 is thus obtained in which the surface layer 238, covers all of the coating 236b, which surface layer possesses surface roughness that is less than that of the lower density second portion of the coating 236b, thereby improving aerodynamic friction.

The examples described in the present disclosure are given by way of non-limiting illustration, and a person skilled in the art can easily, in the light of this disclosure, modify these examples or envisage others, while remaining within the scope of the invention.

Furthermore, the various characteristics of these embodiment or implementation examples may be used singly or combined with one another. When they are combined, the characteristics may be combined as described above or in other ways, the invention not being limited to the specific combinations described in the present disclosure. In particular, unless specified to the contrary, any characteristic described with reference to any one embodiment or implementation may be applied in analogous manner to any other embodiment or implementation.

The invention claimed is:

1. A fabrication method for an abradable coating of varying density, the method comprising the following steps:
   providing a substrate having a first portion with its surface situated at a first level, and a second portion with its surface situated at a second level different from the first level;
   depositing a precursor material on the first and second portions of the substrate;
   compressing the precursor material between the substrate and a bearing surface; and
   sintering the precursor material as compressed in this way in order to obtain an abradable coating having a first portion on the first portion of the substrate, and possessing a first density, and a second portion on the second portion of the substrate, and possessing a second density distinct from the first.

2. A method according to claim 1, wherein the second portion of the substrate is obtained by machining at least one groove in a blank of the substrate.

3. A method according to claim 1, wherein the bearing surface is continuous and rectilinear at least in a direction extending transversely relative to the first and second portions of the substrate.

4. A method according to claim 1, wherein the first portion of the abradable coating possesses final porosity of less than 15%.

5. A method according to claim 1, wherein the second portion of the abradable coating possesses final porosity greater than 20%.

6. A method according to claim 1, further comprising, before the step of depositing the precursor material on the first and second portions of the substrate, a step of forming by sintering a backing layer on the second portion of the substrate, the final porosity of the backing layer being less than 15%.

7. A method according to claim 1, further comprising, after the step of sintering the precursor material, a step of forming by sintering a surface layer on at least a portion of the abradable coating, the surface layer having final porosity of less than 15%.

8. A method according to claim 1, wherein the substrate is a ring sector.

9. A method according to claim 1, wherein the substrate possesses a longitudinal channel between two longitudinal shoulders, the shoulders forming part of the first portion of the substrate, and the bottom of the channel forming part of the second portion of the substrate.

* * * * *